(12) United States Patent
Williamson et al.

(10) Patent No.: US 6,477,249 B1
(45) Date of Patent: Nov. 5, 2002

(54) COMMUNICATIONS SIGNAL SPLITTER AND FILTER

(75) Inventors: Roger James Williamson, Herts (GB); Leslie Derek Humphrey, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/156,740

(22) Filed: Sep. 17, 1998

(30) Foreign Application Priority Data

Dec. 9, 1997 (GB) ............................................. 9726037

(51) Int. Cl.$^7$ .......................... H04M 1/00; H04M 9/00; H04M 11/00
(52) U.S. Cl. .............................. 379/399.01; 379/93.09; 379/93.05; 379/93.01; 379/398; 379/402; 379/394; 379/403; 379/404; 379/405
(58) Field of Search ...................... 379/398, 399.1–402, 379/93.05, 213, 215, 93.09, 403–405

(56) References Cited

U.S. PATENT DOCUMENTS

| 5,627,501 A | | 5/1997 | Biran et al. | |
|---|---|---|---|---|
| 5,757,803 A | * | 5/1998 | Russell et al. | ............... 370/494 |
| 5,848,150 A | * | 12/1998 | Bingel | ......................... 379/399 |
| 6,144,735 A | * | 11/2000 | Bella | ........................... 379/399 |

FOREIGN PATENT DOCUMENTS

| EP | 0 795 977 A2 | 9/1997 |
|---|---|---|
| WO | WO97/20396 A2 | 6/1997 |
| WO | WO97/44947 A1 | 11/1997 |

OTHER PUBLICATIONS

"Broadband Multimedia Delivery over Copper", G Young, K T Foster and J W Cook, BT Technology Journal, vol. 13, No. 4, Oct. 1995.
"ADSL and VADSL Splitter Design and Telephony Performance", John Cook and Phil Sheppard, IEEE Journal on Selected Areas in Communications, vol. 13, No. 9, Dec. 1995.

* cited by examiner

Primary Examiner—Forester W. Isen
Assistant Examiner—Ramnandan Singh
(74) Attorney, Agent, or Firm—Lee, Mann, Smith, McWilliams, Sweeney & Ohlson

(57) ABSTRACT

A splitter separates telephony traffic (POTS) from digital subscriber line (ADSL) traffic occupying a higher frequency band. The splitter comprises a low-pass filter for passing the telephony traffic, the low-pass filter being operable to vary its filtering response between a first low-pass response for use during telephony speech traffic, and a second, more restrictive, low-pass response for use during at least part of the time that telephony signalling traffic is present. During speech traffic a filter is used which provides a good impedance match with a telephony terminal or linecard so as to minimize detrimental effects on sidetone and echo performance which may impair a user's speech quality. The filter response can be varied according to a detected property of the telephony traffic, such as amplitude or rate of change of amplitude of the traffic.

17 Claims, 8 Drawing Sheets

LOW AMPLITUDE (SPEECH)

HIGH AMPLITUDE (SIGNALLING)

COMMUNICATIONS SIGNAL SPLITTER AND FILTER

TECHNICAL FIELD

This invention relates to a signal splitter device for separating telephony traffic from further traffic occupying a higher frequency band, such as digital subscriber line traffic. It also relates to a filter for use in filtering telephony traffic.

BACKGROUND OF THE INVENTION

Telecommunications operators' fixed networks were originally constructed entirely from metallic transmission media (predominantly copper) carrying voice band signals in the region 300 Hz to 3.4 kHz, a service commonly known as Plain Old Telephone Service (POTS). While the backbone of the transmission network that interconnects switching centres is now mainly based on optical technology, the access portion of the network that connects switches to customers is still dominated by twisted copper pairs. Many telecommunications operators wish to use their existing POTS copper access network to deliver broadband services such as data delivery (e.g. Internet), teleworking and video on demand. The current technologies for delivering data over the access network are (a) voice band modems which code data into signals lying within the voice band, supporting data rates of up to 50 kb/s, and (b) ISDN.

A number of alternate technologies have been developed to allow high bit rate services to be delivered over the copper access network. One such technology is asymmetric digital subscriber loop (ADSL). POTS traffic is carried over the conventional 0 to 4 kHz frequency band and the ADSL traffic occupies the frequency band above POTS in the region 24 kHz to 1.1 MHz. Both POTS traffic and ADSL traffic can be simultaneously carried over the same wire pair. An overview of this technology is described in an article "Broadband Multimedia Delivery over Copper" by G Young, K T Foster and J W Cook in BT Technology Journal, volume 13, number 4, October 1995. A number of different digital modulation techniques have been proposed for carrying the digital data, such as discrete multitone modulation (DMT) where data is carried by a large number of frequency carriers, Quadrature Amplitude Modulation (QAM) and Carrierless Amplitude/Phase Modulation (CAP). As well as ADSL, higher capacity systems have been proposed such as very high bit rate digital subscriber line (VDSL/VADSL). The generic term for these technologies is xDSL.

At the telecommunications operator's exchange, and at the subscriber end, the POTS traffic and xDSL traffic needs to be separated. This is achieved by a splitter device comprising a low-pass filter which delivers POTS signals to a telephone or POTS line card, and a high pass filter which delivers xDSL signals to an xDSL modem or line card.

An article "ADSL and VADSL Splitter Design and Telephony Performance" by John Cook and Phil Sheppard, in IEEE Journal on Selected Areas in Communications, volume 13, number 9, December 1995, describes two approaches to designing splitters. The article describes the use of a passive low-pass filter and concludes that this can have an adverse affect on telephony transmission performance. The article also proposes an active, powered, filter which uses generalised immittance converters (GIC) at both the input and output of the filter. This, however, requires powering which must be obtained separately and can lead to a filter which is costly and bulky.

U.S. Pat. No. 5,627,501 "Signal Coupler with Automatic Common Line Attenuation Compensation" describes a signal coupler for use with a line carrying POTS and ADSL traffic, where a variable impedance circuit is placed in series with a low-pass filter and the POTS terminal, the impedance circuit being switched on or off to minimise the detrimental effect on filter performance which strong signals can have.

There is a need to provide adequate low-pass filtering of the POTS traffic to prevent corruption of xDSL traffic operating in the frequency bands above the voice frequencies.

SUMMARY OF THE INVENTION

The present invention seeks to provide an improved splitter device.

According to a first aspect of the present invention, there is provided a splitter for separating telephony traffic from further traffic occupying a higher frequency band, the telephony traffic comprising speech and signalling traffic, the splitter device comprising:

an input for transmitting and receiving the telephony and further traffic;

a high-pass filter coupled to the input for passing the further traffic; and, a low-pass filter coupled to the input for passing the telephony traffic, the low-pass filter being operable to vary its filtering response between:

a first low-pass response for use during telephony speech traffic; and, a second, more restrictive, low-pass response for use during at least part of the time that telephony signalling traffic is present.

The second, more restrictive low-pass response can be used for the whole of the time occupied by the telephony signalling traffic, at the beginning and end of signalling traffic periods, or for some other duration.

Brief Description of the Drawings

For a better understanding of the invention, and to show by way of example how it may be carried into effect, embodiments will now be described with reference to the accompanying drawings, in which.

DETAILED DESCRIPTION OF THE INVENTION

Figure 1:
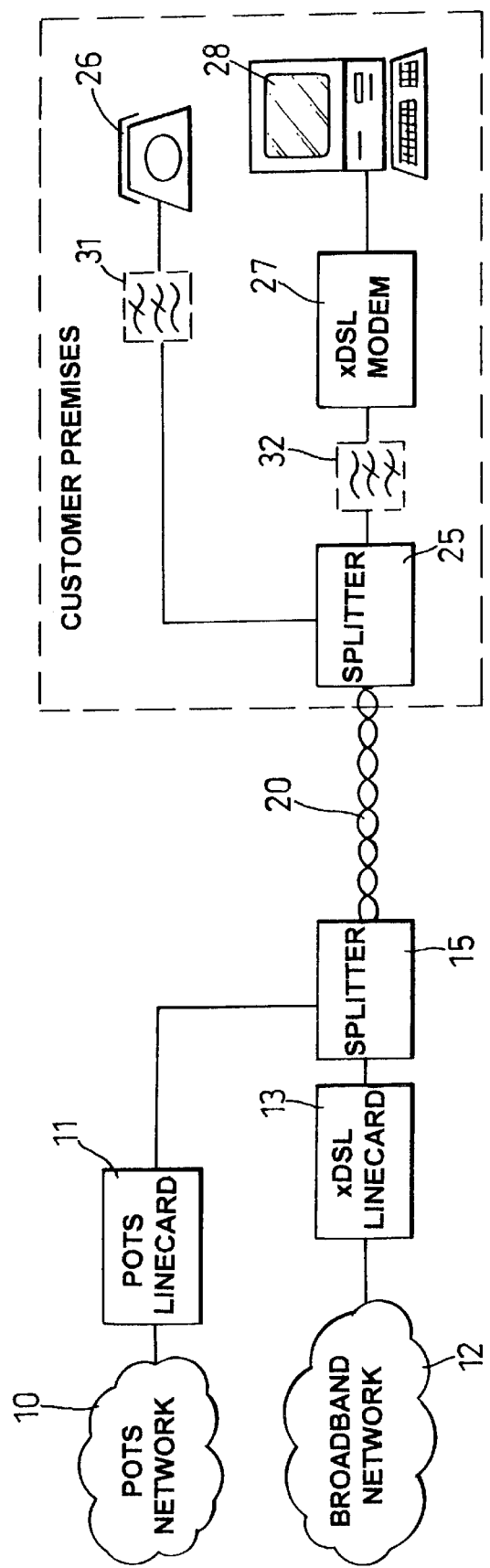
FIG. 1 shows a network for delivering POTS and broadband services to a subscriber.

In our arrangement and method, we have found it to be unnecessary to have a restrictive low-pass filter permanently in use. An advantage of this arrangement is that during speech traffic a filter is used which provides low loss and a good impedance match with a telephony terminal or linecard so as to minimize detrimental effects on sidetone and echo performance which may impair a user's speech quality. A good impedance match is possible because the filter only requires a low-order structure. The frequency content of speech is band-limited by the speech itself and by the microphone and audio circuits of a terminal so that a low-order filter can provide adequate filtering. However, during signalling, such as loop-disconnect signalling, a filter with a more restrictive response is used to attenuate high-frequency components in the signalling. It is possible to use a filter which has a more restrictive response because the poorer impedance matching of the restrictive filter can be tolerated at this time.

A further advantage of this arrangement is that simple filters can be used. It is possible to use entirely passive components, thereby minimizing power consumption. The filter can also be made small and cheaply.

The speech traffic can be POTS traffic comprising speech from a user or data from some terminal equipment such as a fax machine or modem that uses the voice band. The further traffic can be digital subscriber line traffic such as ADSL or VDSL which shares the same line as the telephony traffic.

The high-pass filter and low-pass filter of the splitter may be housed in a single unit, or the filters may be physically separate, the high-pass filter being installed in a line leading to equipment that transmits/receives the further traffic, and the low-pass filter being installed in a line leading to telephony equipment. There may be several low-pass filters, one installed in each line leading to telephony equipment. This arrangement allows easier installation of equipment, and may allow a subscriber himself to install the equipment.

Preferably the splitter further comprises a detector for detecting a property of the telephony traffic, the filter response being varied according to the detected property. The low-pass filter response can be varied according to one or more of the following properties:

amplitude (voltage or current) of the telephony traffic;

rate of change of amplitude (voltage or current) of the telephony traffic;

frequency content of the telephony traffic.

It is also possible to detect the different types of POTS signals themselves and to vary the filter response according to this detection. One preferred way of varying the filter response is according to amplitude of the POTS traffic. This is possible because signaling has a high signal amplitude and speech has a low signal amplitude. This allows a simple way of varying the filter response.

The second, more restrictive, low-pass response can have a lower cutoff frequency, a steeper roll-off or a combination of these characteristics. The steeper roll-off can be achieved by varying the order of the filter.

The filter response can be varied by choosing between first and second low-pass filters, or by permanently using a first low-pass filter and using a second low-pass filter in addition to the first when it is required. This latter method has the advantage that it reduces the number of required filter elements as some are used in both filters.

The detector can be placed in series with at least one of the filter elements and be operable to switch said at least one filter element according to the detected property of the telephony traffic. Switching can be achieved by the detector varying in resistance according to the detected property whereby to switch said at least one element on or off.

Preferably the detector has a non-linear resistive response.

Advantageously the detector is one of the elements of the filter, such as an inductive device, which is responsive to a change in current.

One preferred low-pass filter comprises an inductor shunted by a parallel combination of a first capacitor and a series combination of a second capacitor and a non-linear resistive device.

Another preferred low-pass filter comprises a relay coil shunted by a parallel combination of a first capacitor and a series combination of a second capacitor and a switch of the relay.

A further preferred low-pass filter comprises a relay coil shunted by a series combination of a capacitor and a switch of the relay, there being a second capacitor bridging the switch.

Another aspect of the invention provides a low-pass filter comprising an input for receiving telephony traffic, the telephony traffic comprising speech and signalling traffic, the filter being operable to pass the telephony traffic and to vary its filtering response between:

a first low-pass response for use during telephony speech traffic; and, a second, more restrictive, low-pass response for use during at least part of the time that telephony signalling traffic is present.

This low-pass filter can include any of the preferred features described above, or in the following description.

A further aspect of the invention provides a method of operating a splitter device for separating telephony traffic from further traffic occupying a higher frequency band, the telephony traffic comprising speech and signalling traffic, the method comprising:

transmitting or receiving, at an input to the splitter device, the telephony and the further traffic;

separating the further traffic using a high-pass filter coupled to the input;

separating the telephony traffic using a low-pass filter coupled to the input; and, varying the filtering response of the low-pass filter between a first low-pass response which is used during telephony speech traffic and a second, more restrictive, low-pass response which is used during at least part of the time that telephony signalling traffic is present.

A still further aspect of the invention provides a method of operating a low-pass filter comprising an input for receiving telephony traffic, the telephony traffic comprising speech and signalling traffic, the method comprising passing the telephony traffic through the filter and varying the filtering response between:

a first low-pass response which is used during telephony speech traffic; and, a second, more restrictive, low-pass response which is used during at least part of the time that telephony signalling traffic is present.

Preferred features may be combined as appropriate, and may be combined with any of the aspects of the invention, as would be apparent to a person skilled in the art.

FIG. 1 shows a network for delivering digital subscriber line data and conventional POTS telephony to a subscriber premises. Telephony signals from POTS network 10 arrive at POTS line card 11 at a telecommunications operator's exchange. Data signals from a broadband network 12 arrive at an xDSL line card 13. The POTS signals and xDSL signals are combined at a splitter 15 for delivery over the same cable 20 to a customer premises. Cable 20 is typically a copper twisted-pair. At the customer premises a splitter 25 separates the telephony signals, for delivery to a telephone 26, and the xDSL signals for delivery to an xDSL modem 27 and computer, or other equipment 28. The splitter may comprise a single unit, as shown by unit 15, 25 or the components of the splitter, i.e. a high-pass filter and a low-pass filter, may be separate as shown by filters 31, 32.

Figure 2:
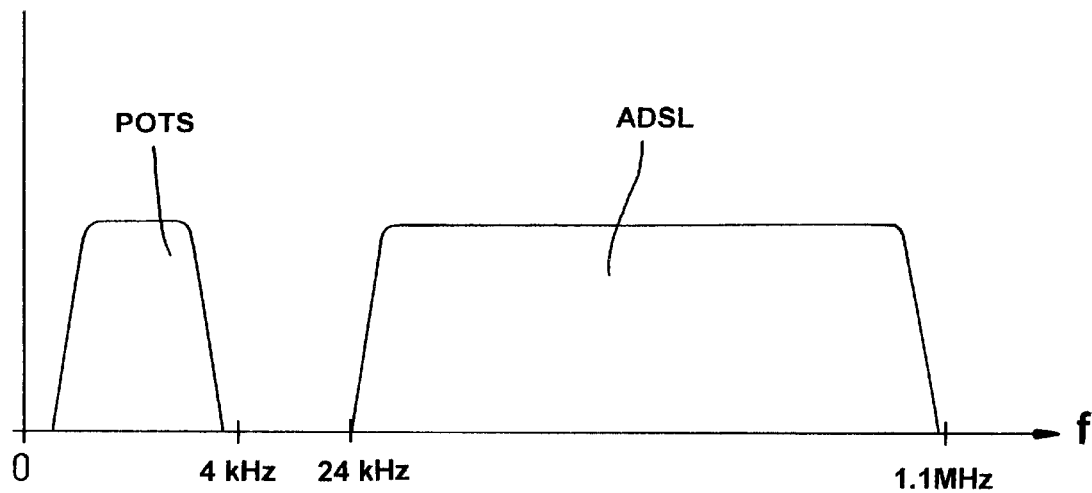
FIG. 2 shows how POTS and ADSL traffic is carried over the line in the network of FIG. 1.

Various technologies exist for delivering the digital data alongside POTS traffic. ADSL is one such method for transmitting digital data at high bit rates over the existing installed twisted pairs. With reference to FIG. 2, ADSL transmits digital data in a frequency band above that used to carry POTS traffic. ADSL typically uses the frequency band 24 kHz to 1.1 MHz. Conventional POTS traffic typically uses the frequency band 300 Hz to 3.4 or 4 kHz. ADSL supports communication in forward and reverse directions by allocating specific frequency bands to the forward and reverse channels. Filtering is required to ensure that the POTS traffic and ADSL traffic do not interfere with each other.

Figure 3:
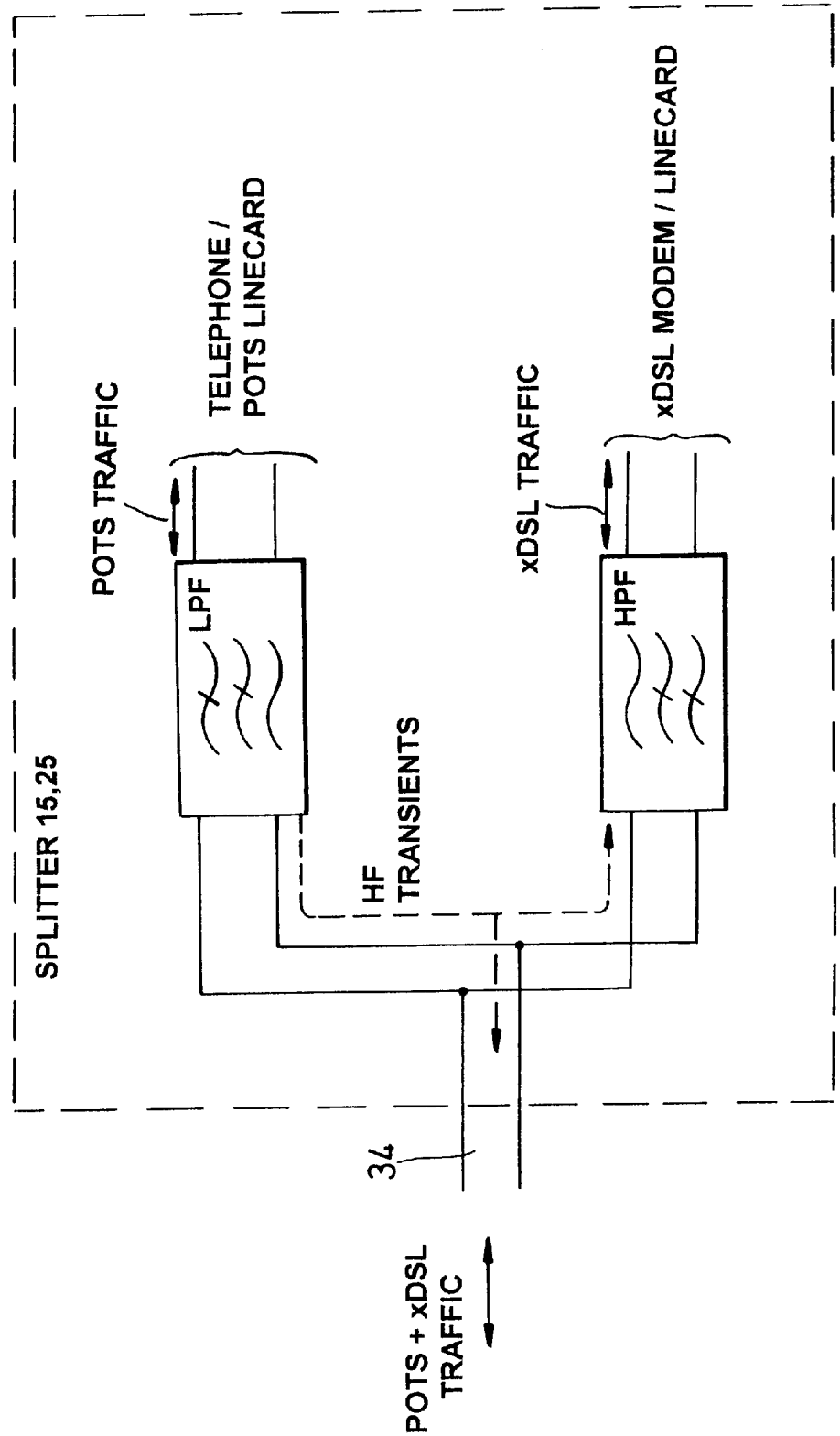
FIG. 3 shows a splitter for use in the network of FIG. 1.

FIG. 3 shows the splitter unit 15, 25 in more detail. POTS and xDSL traffic arrives at an input 34 to the splitter over twisted pair cable 20. A low-pass filter LPF and a high pass filter HPF are coupled to the input 34. The low-pass filter is designed to pass only the POTS traffic and the high pass filter is designed to pass only the xDSL traffic. A further requirement of the low-pass filter is that it should prevent high frequency transients, which can be caused by some forms of POTS signalling, from passing to the xDSL modem or line 20 where they could interfere with xDSL traffic and cause corruption. Referring again to FIG. 1, the high-pass filter and low-pass filter of the splitter may be separated, the high-pass filter 32 being installed in a line leading to xDSL modem 27, or being incorporated in the xDSL modem itself, and the low-pass filter 31 being installed in a line leading to terminal equipment 26. The low-pass filter can take the form of a dongle that is inserted in the telephone line.

Figure 4A:
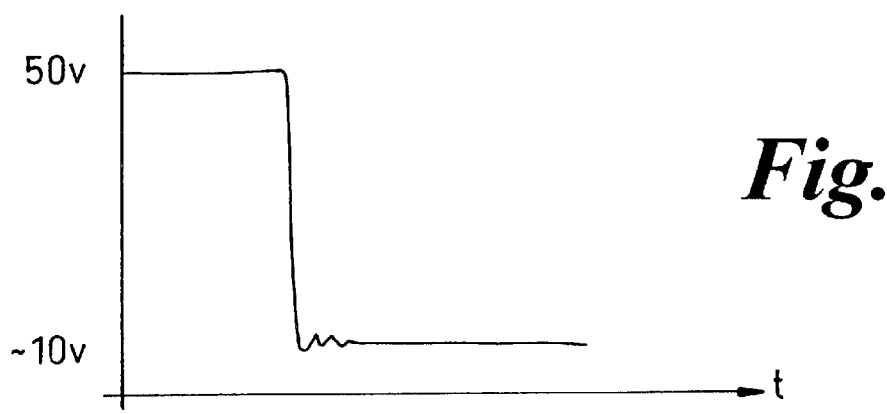
FIGS. 4A, 4B and 4C show types of POTS signalling where transients occur.
Figure 4B:
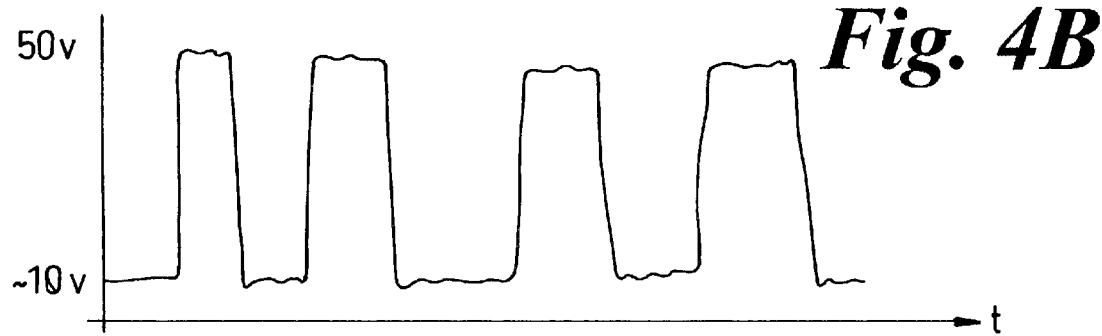
Figure 4C:
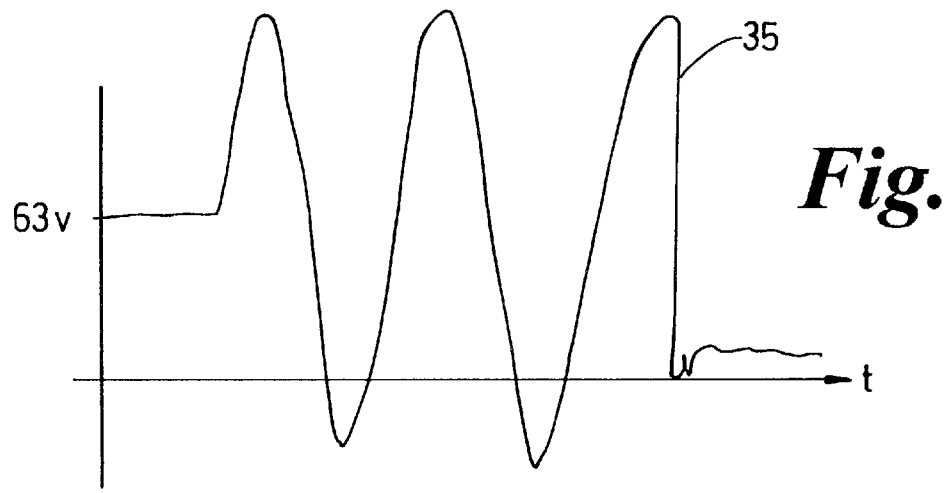

Telephones signal by two methods, either (i) by rapidly varying their impedance which creates a pulse or transient from the line voltage, know as loop-disconnect signalling, or (ii) by sending two selected voice band tones simultaneously along the line, known as dual tone multi-frequency (DTMF) signalling. The pulse or transient that is generated in loop-disconnect signalling can contain frequencies outside the voice band which might interfere with ADSL. FIGS. 4A, 4B, 4C show three instances where transients can occur. Firstly, FIG. 4A shows a telephone going "off-hook". The line voltage rapidly changes between 50 volts and around 10 volts. Secondly, FIG. 4B shows loop-disconnect dialling where a telephone signals a required telephone number by making and breaking the loop connection. This results in a succession of sharp-edged pulses. FIG. 4C shows "tip-ringing" where the exchange generates a ringing tone which is superimposed upon the line voltage. When a subscriber goes off-hook there is a sudden transition 35 which causes high frequency components. All of the signalling samples just described contain sharp transitions between a high and a low voltage which can generate high frequency components that can interfere with xDSL traffic.

The low-pass filter which is used in splitter 15, 25 must be constructed such that it does not diminish the performance of the telephony service. The main requirements of this filter are that (i) The filter must have low insertion loss. That is, the filter must not unduly attenuate the telephony signals.

(ii) The filter must have low return loss at both its input and output. Return loss is a measure of the filter's ability to reflect power. Ideally the filter is perfectly matched with the transmission line and terminal equipment to which it is coupled, and therefore does not reflect power. A poor filter return loss causes echoes on the line, which can be distracting to a subscriber, and also causes a change in the sidetone level heard by a subscriber, i.e. the amount by which a person hears their own voice when involved in a telephone conversation.

(iii) The filter must match the impedance of the line and the telephone as closely as possible.

Furthermore, (iv) the filter must pass the ringing voltage of up to 80Vrms without breakdown.

(v) the filter must pass the DC line voltage of up to 100V without breakdown.

(vi) the filter must take a DC current of 50 mA without saturation.

(vii) the filter must have low impact on the usefulness of conventional POTS line test systems.

The requirement for low loss requires the use of lossless reactive components (inductors and capacitors). This dictates that the termination impedance of the filter be purely resistive. A lossless LC filter behaves very much like a lossless LC transmission line in the passband, with the characteristic impedance being purely resistive and given by:

$$Z_O = \text{root } (L/C)$$

However, because the transmission line is not lossless at voice band frequencies, the characteristic impedance of transmission lines and terminal equipment is complex so that for good return loss the termination impedance needs to match this and thus also needs to be complex. A fixed filter which adequately attenuates the high frequencies of the impulses created by telephones in loop-disconnect signalling needs to have a sharp filter response and hence a high order structure. This level of filtering will significantly transform the impedance of the input to the filter so that the output impedance will be a poor match and hence cause poor return loss. While signalling transients will be adequately attenuated, speech performance will be unduly impaired.

Figure 5:
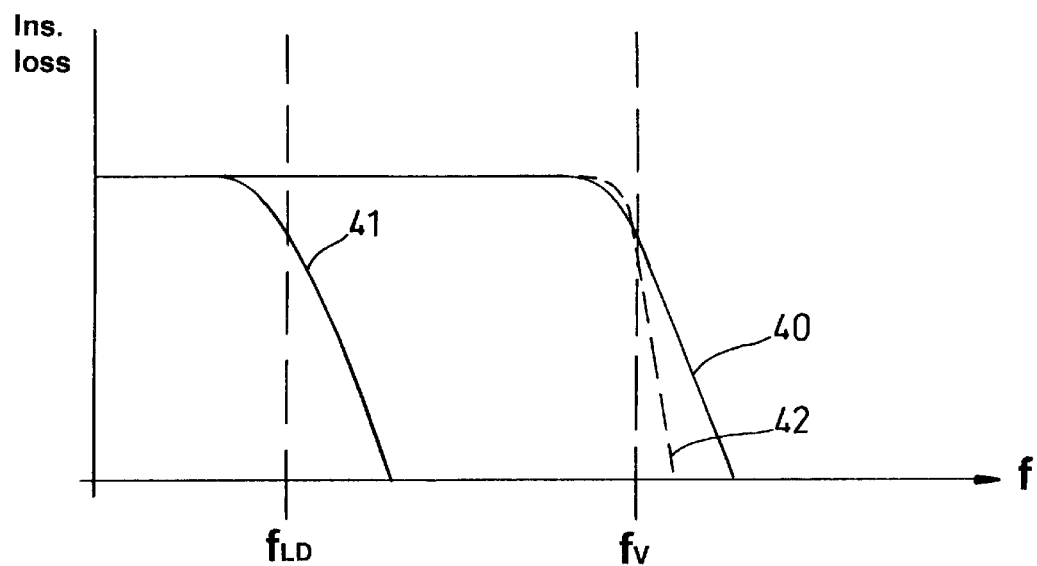
FIG. 5 shows filter responses for a filter in accordance with an embodiment of the invention.

A filter in accordance with an embodiment of the invention varies its frequency response according to whether speech or signalling is being carried over the POTS line. FIG. 5 shows two examples of how the frequency response of the low-pass filter can be varied. The frequency response is shown as a graph of insertion loss against frequency. The response labelled as 40 corresponds to the filter response that is used when speech traffic is carried over the line. A 3 dB point $f_v$ of above 4 kHz is preferred such that return loss across the voice band is adequate. This requires a 3 dB point of around 8 kHz for a second-order filter. The second response, labelled as 41, corresponds to the low-pass response which is used when POTS loop-disconnect signalling is being carried over the line. Response 41 has a lower cut-off frequency $f_{LD}$ which is designed to pass the signalling pulses sufficiently uncorrupted and to sufficiently attenuate any high-frequency components caused by transients in the signalling. In practice this requires a giving the loop-disconnect signalling pulses a rise time of a few milliseconds. An alternative form for the second response is shown by dashed line 42. Here, instead of having a lower cut-off frequency, the filter response has a sharper roll-off.

Low-pass filter response 40, used during speech traffic, can be achieved by a fairly low order filter, e.g. a second-order filter, which transforms the impedance much less than a fixed, higher-order filter, and thus the output impedance of the filter will be similar to the terminal load impedance and the return loss will be adequate. Moreover, the voice band signals which are carried during this time are both of low amplitude and are naturally band limited because of the frequency response of speech itself and the microphone and audio circuits of a terminal. Thus for unimpaired xDSL communication during speech activity, a low order filter is all that is required. During loop-disconnect signalling, when low-pass filter response 41 is used, there is a much more lenient requirement for return loss. This is because a person is not speaking at this time and therefore the requirements for an adequate level of sidetone and minimal echo are not necessary. A higher order filter, or a filter with a lower roll-off can therefore be used. This filter could also include lossy elements.

The low-pass filter, in both states, has a high input impedance at the frequencies used for xDSL and therefore does not upset operation of the high-pass filter and xDSL signal chain.

Figure 6:
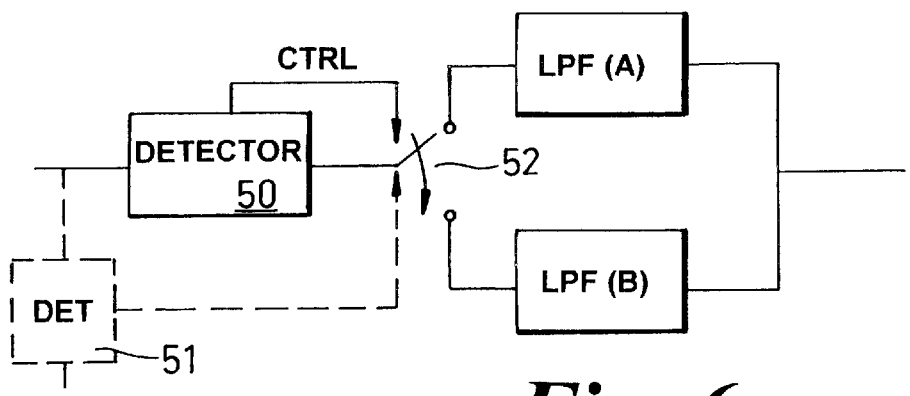
FIG. 6 shows one way of implementing first and second filter responses.
Figure 7A:
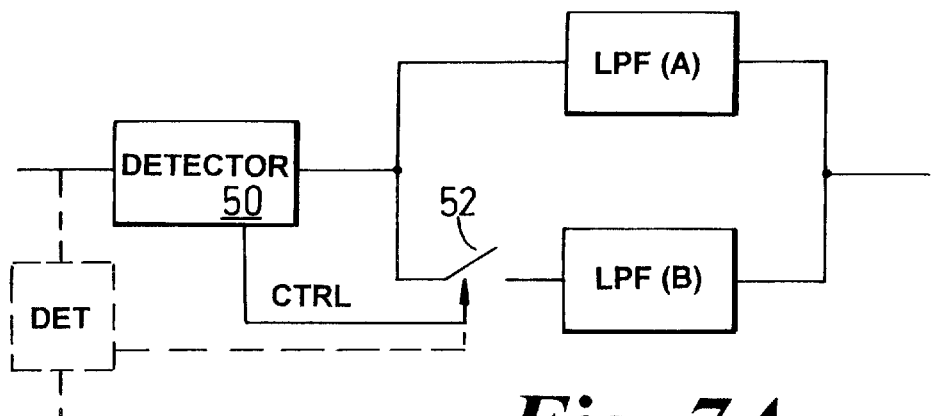
FIGS. 7A and 7B show two further ways of implementing different filter responses.
Figure 7B:
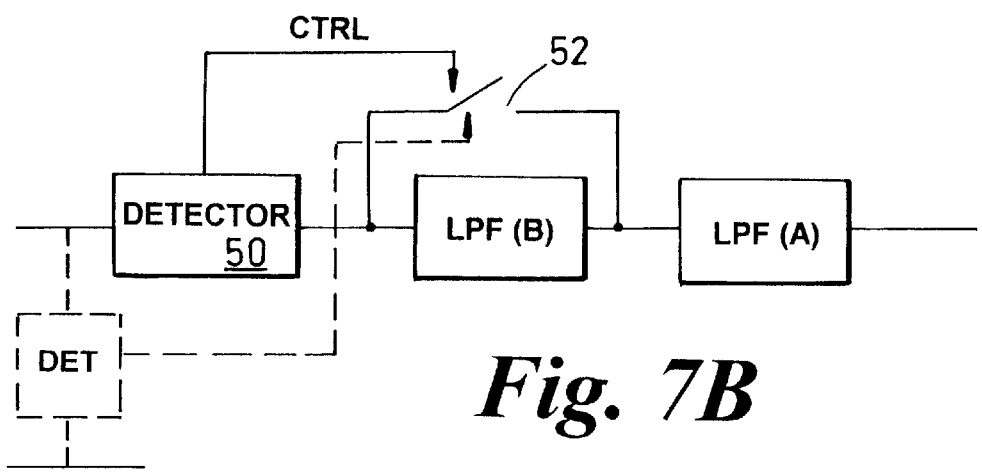

FIGS. 6, 7A and 7B show alternative ways of achieving the two different frequency responses. In FIG. 6, a first low-pass filter LPF(A) and a second low-pass filter LPF(B) are alternately switched into use depending on the filtering response that is required. In FIG. 7A, a first low-pass filter (A) is permanently in use and a second low-pass filter (B), or one or more filter elements, are switched into use in parallel with the first filter to cause the second response. In FIG. 7B, the first low-pass filter (A) is also permanently in use and a second low-pass filter (B), or one or more filter elements, is switched in series with the first filter to cause the second response. In each arrangement some form of detector is required to sense when to vary the filter response, A detector can be placed in series with the line as shown by detector 50, or in shunt across the line as shown by detector 51. The detector issues a control signal CTRL which controls the state of a switching device 52. The detector output can be fed to a comparator device for comparison with a reference level representative of a condition at which the filter response should be varied.

The switching device can be an electrical or electronic switch, such as a transistor or thyristor, or a switch that is associated with a relay coil.

A simplified arrangement, which is particularly appropriate for the configurations of FIG. 7A or 7B, incorporates the detector in filter (B). The detector and switching functions may be combined by using a device that varies in resistance, thereby performing a switching function, in response to some property of the telephony traffic.

The detector can detect one or more of the properties of POTS traffic and use this to make the decision as to when to vary the filter response. Suitable properties of the POTS traffic include:

(i) absolute signal amplitude (voltage or current)—the filter response is changed when the voltage or current amplitude rises above, or falls below, a particular threshold level. POTS speech signals and POTS loop-disconnect signalling have different amplitudes. This allows a simple way of detecting when to vary the filter response.

(ii) rate of change of signal amplitude (voltage or current)—the filter response is changed when the rate of change of voltage or current rises above or falls below a particular threshold level;

(iii) signal frequency content created through the rate of change of voltage or current—the filter response is changed when the high frequency content, representative of a signalling transient, exceeds a predetermined threshold value, or when the rate of change of frequency content exceeds a predetermined threshold value.

Figure 8:
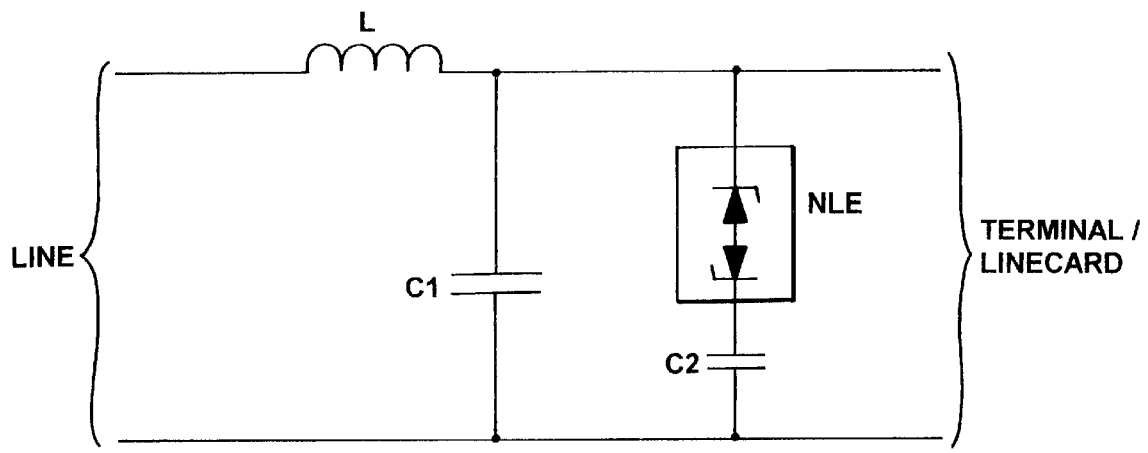
FIG. 8 shows an example of a filter using a non-linear element.

FIG. 8 shows one example of a low-pass filter whose response can be changed. This filter is responsive to change in amplitude of voltage on the line. The filter is a second-order filter comprising an inductor L and first and second capacitors C1, C2. Inductor L is placed on the line side of the filter to present a high impedance at high frequencies. Capacitor C2 is placed in series with a non-linear element NLE whose response changes in a non-linear manner according to voltage on the line. This voltage non-linear element NLE can be constructed in a number of ways, such as by a pair of back-to-back zener diodes, a transient voltage surge suppressing device such as a HARRIS SEMICONDUCTOR ML Series device or a suitable transistor arrangement. The illustrated arrangement is particularly advantageous as the detection of signal amplitude and 'switching' is performed by a single device that is placed in series with the filter element C2.

Figure 9A:
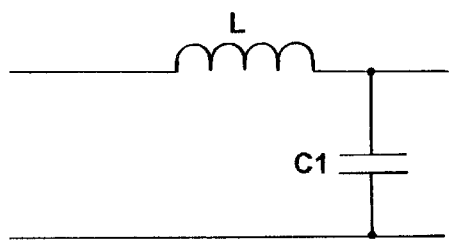
FIGS. 9A and 9B show equivalent circuits for the filter of FIG. 8 at different signal amplitudes.
Figure 9B:
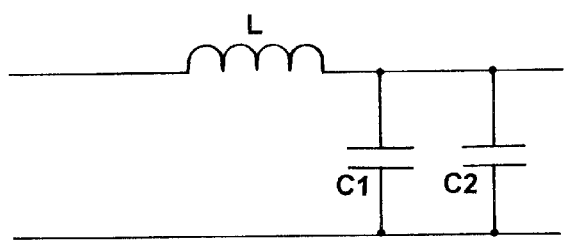
Figure 10:
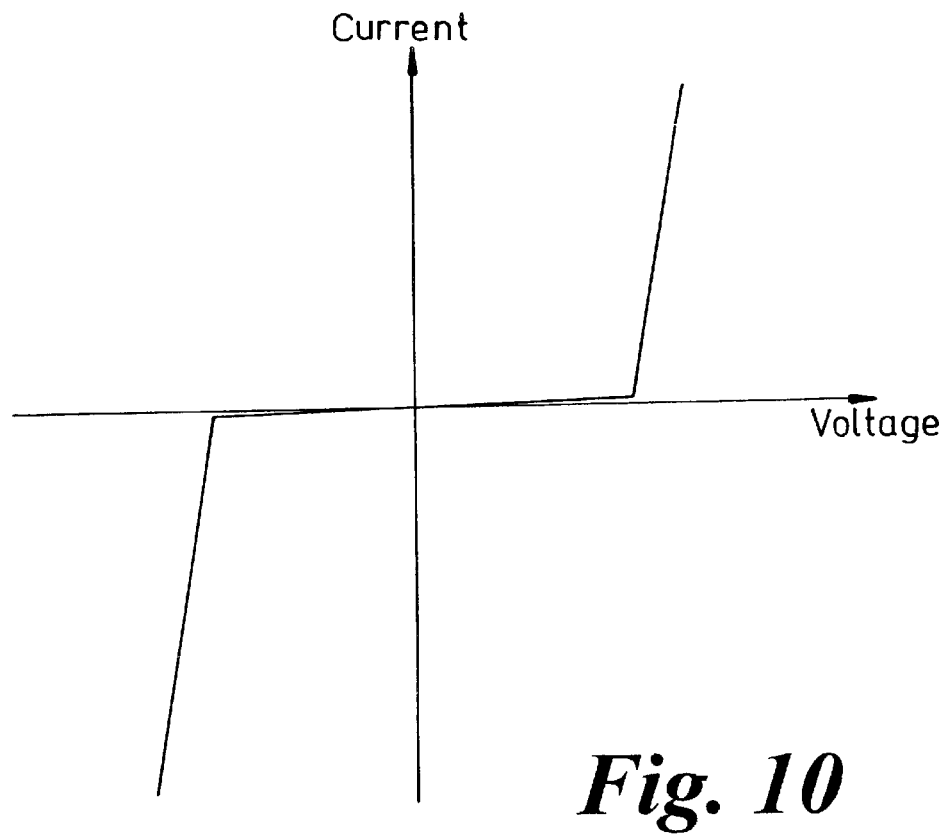
FIG. 10 shows a response of the non-linear element.

FIG. 10 shows the performance of the non-linear device, showing current against voltage. Above a certain threshold voltage the current increases sharply. The effect of the non-linear element is that for low amplitude signals, such as speech, the NLE has a high resistance and therefore capacitor C2 is not active. With high amplitude signals, such as POTS loop-disconnect signalling, the NLE has a low resistance and therefore capacitor C2 is active and forms part of the low-pass filter. FIG. 9A shows the equivalent circuit for the low-pass filter with low amplitude signals; with only inductor L and capacitor C1 in use. FIG. 9B shows the equivalent circuit for the low-pass filter with high amplitude signals, with inductor L and capacitors C1 and C2 in operation in parallel thus reducing the cut-off frequency of the filter.

Speech typically has an amplitude of 300 mVrms, and modem data in the speech band typically has an amplitude of 700 mVrms. Loop-disconnect signalling varies between around 10V and 50 or 63V. A suitable threshold value for the non-linear element (NLE), and a breakdown voltage for the zener diodes forming the NLE, is 3.5V.

Figure 11:
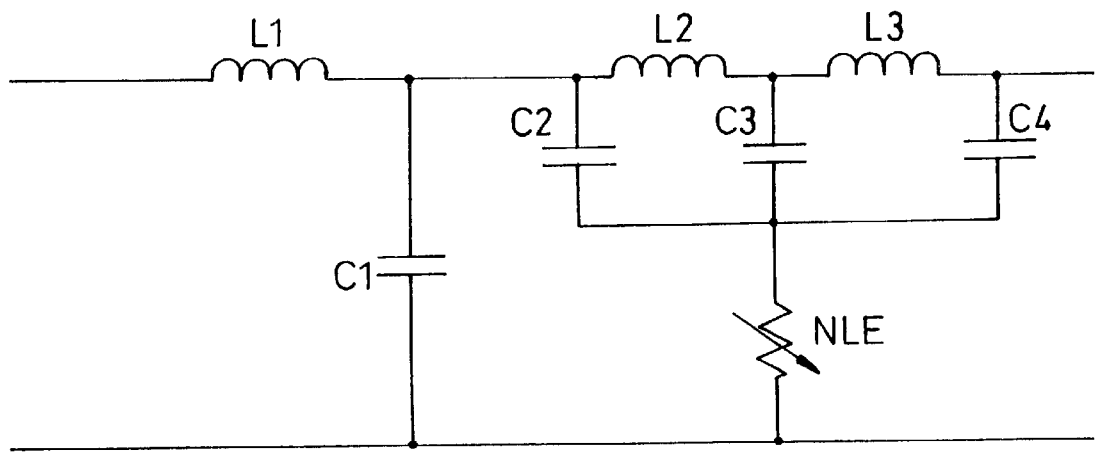
FIG. 11 shows an example of a higher-order filter.

FIG. 11 shows a more elaborate low-pass filter where capacitors C2, C3, C4 are used when the non-linear element NLE is in a low impedance state. In this example the filter will change from a low-order filter to a higher-order filter.

Figure 12:
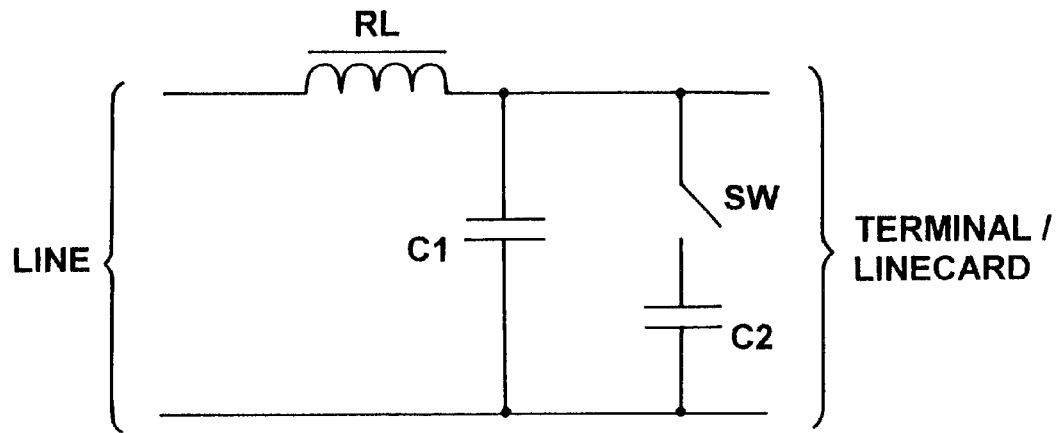
FIG. 12 shows a first filter using a current-sensing element.
Figure 13:
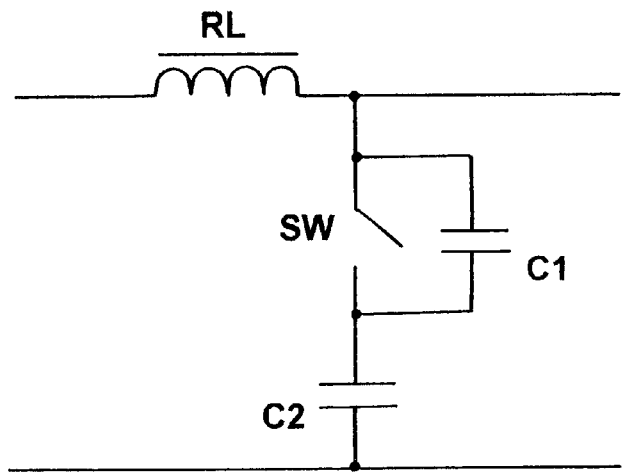
FIG. 13 shows another filter using a current-sensing element.

Alternatively, a device which changes impedance with current can be used. FIGS. 12 and 13 show examples of second order low-pass filters where current sensing relays are used. In FIG. 12, the low-pass filter comprises a relay coil RL, capacitor C1 and a series arrangement of the relay contact SW and a second capacitor C2. During low amplitude speech signals switch SW is open so that the filter comprises just the relay coil RL and capacitor C1. During high amplitude signalling switch SW closes and the filter comprises relay coil RL and a parallel combination of capacitors C1 and C2. If insufficient inductance is available from the relay coil then a further inductor can be placed in series with the relay coil.

FIG. 13 shows an alternative arrangement in which capacitor C1 is placed in parallel with switch contact SW. During speech traffic, switch contact SW is normally open such that the relay coil RL and the series combination of capacitors C1 and C2 are in use. During high amplitude signalling switch contact SW is closed such that the filter comprises just relay coil RL and C2.

A suitable relay is a telephone line current sensing reed relay-type 55 manufactured by ERG COMPONENTS which can have a coil resistance of 6 ohm and switch with currents less than 15 mA.

Where rate of change of current is used to vary the filter response a pulse-transformer can be placed in series with the line, the output of the pulse transformer feeding a transistor switch that is placed in series with a capacitor or other element of the filter. The pulse transformer is responsive to a rate of change in current i.e. a transient and triggers the transistor to switch the capacitor on or off as required.

A further method of varying the filter response is to use an inductance where its value varies with current due to saturation of the field in the ferrite of the inductor.

Where voltage sensitive capacitors are used, such as electrolytic capacitors, it may be necessary to place the capacitor within a bridge rectifying circuit so that the capacitor is not damaged.

What is claimed is:

1. A splitter for separating telephony traffic from further traffic occupying a higher frequency band, the telephony traffic comprising speech and signalling traffic, the splitter device comprising:

an input for transmitting and receiving the telephony and the further traffic;

a detector for detecting a property characteristic of the telephony traffic;

a high-pass filter coupled to the input for passing the further traffic; and, a low-pass filter coupled to the input for passing the telephony traffic, the low-pass filter being arranged so as to vary its filtering response between:

a first low-pass response for use during telephony speech traffic; and, a second, reduced cut-off frequency, low-pass response for use during at least a portion of the time that telephony signalling traffic is present; and wherein the filter response is varied according to the property characteristic of the telephony traffic, said property being selected from the group consisting of, amplitude of the telephony traffic, rate of change of amplitude of the telephony traffic, and frequency content of the telephony traffic.

2. A splitter according to claim 1 wherein the second, more restrictive, low-pass response has a lower cut-off frequency.

3. A splitter according to claim 1 wherein the second, more restrictive low-pass response has a steeper roll-off.

4. A splitter according to claim 3 wherein the second, more restrictive low-pass response is achieved by varying the order of the filter.

5. A splitter according to claim 1 wherein the low-pass filter varies its filtering response by choosing between first and second low-pass filters.

6. A splitter according to claim 1 wherein the low-pass filter comprises a first low-pass filter and the low-pass filter varies its filtering response by using a second low-pass filter in addition to the first.

7. splitter according to claim 1 wherein the low pass filter comprises a plurality of filter elements, the detector being placed in series with hat least one of the filter elements and being operable to switch said at least one filter element according to the detected property of the telephony traffic.

8. A splitter according to claim 7 wherein the detector varies in resistance according to the detected property whereby to switch said at least one element on or off.

9. A splitter according to claim 8 wherein the detector has a non-linear resistive response.

10. A splitter according to claim 1 wherein the detector is one of the elements of the filter.

11. A splitter according to claim 10 wherein the detector is an inductive device.

12. A splitter according to claim 1 wherein the detector is responsive to a change in current.

13. A splitter according to claim 12 wherein the detector comprises a current-sensing relay.

14. A splitter according to claim 1 comprising an inductor shunted by a parallel combination of a first capacitor and a series combination of a second capacitor and a non-linear resistive device.

15. splitter according to claim 1 comprising a relay coil shunted by a parallel combination of a first capacitor and a series combination of a second capacitor and a switch of the relay.

16. A splitter according to claim 1 comprising a relay coil shunted by a series combination of a capacitor and a switch of the relay, there being a second capacitor bridging the switch.

17. A splitter according to claim 1 wherein the telephony traffic comprises Plain Old Telephone Service (POTS) and the further traffic comprises Asymmetric Digital Subscriber Line (ADSL).

* * * * *